US008719384B2

(12) United States Patent
Lambert et al.

(10) Patent No.: US 8,719,384 B2
(45) Date of Patent: May 6, 2014

(54) SERVICE DISCOVERY METHODS (75) Inventors: Paul A. Lambert, Mountain View, CA (US); Raja Banerjea, Sunnyvale, CA (US); Milind Kopikare, San Jose, CA (US); Robert Fanfelle, Redwood City, CA (US)

(73) Assignee: Marvell World Trade Ltd., St. Michael (BB)

( * ) Notice: Subject to any disclaimer, the term of this patent is extended or adjusted under 35 U.S.C. 154(b) by 586 days.

(21) Appl. No.: 12/499,931

(22) Filed: Jul. 9, 2009

(65) Prior Publication Data

US 2010/0010899 A1 Jan. 14, 2010

Related U.S. Application Data (60) Provisional application No. 61/080,152, filed on Jul. 11, 2008.

(51) Int. Cl.
*G06Q 30/00* (2012.01)

(52) U.S. Cl.
USPC ........... 709/220; 709/222; 709/227; 709/228; 709/237; 709/245; 715/14.58; 715/14.64; 713/320

(58) Field of Classification Search
USPC ................. 709/220, 222, 227–228, 237, 245; 705/14.58, 14.64; 713/320
See application file for complete search history.

(56) References Cited

U.S. PATENT DOCUMENTS

| 5,559,800 | A  | * | 9/1996  | Mousseau et al. ............ 370/401 |
| 5,657,345 | A  | * | 8/1997  | Lazaridis ...................... 375/222 |
| 6,604,140 | B1 |   | 8/2003  | Beck et al. |
| 6,891,820 | B1 |   | 5/2005  | Pham et al. |
| 6,901,275 | B1 | * | 5/2005  | Aoyagi ......................... 455/574 |
| 7,035,240 | B1 | * | 4/2006  | Balakrishnan et al. ....... 370/338 |
| 7,181,442 | B2 | * | 2/2007  | Yeh et al. ...................... 707/770 |
| 7,447,793 | B2 | * | 11/2008 | Morioka ....................... 709/231 |
| 7,505,795 | B1 | * | 3/2009  | Lim et al. ...................... 455/574 |
| 8,010,168 | B2 | * | 8/2011  | Benveniste ................... 455/574 |
| 8,032,317 | B2 | * | 10/2011 | Houston et al. ................. 702/62 |
| 2002/0095488 | A1 | * | 7/2002 | Primak ......................... 709/223 |
| 2003/0134622 | A1 | * | 7/2003 | Hsu et al. ...................... 455/414 |
| 2003/0195019 | A1 | * | 10/2003 | Litwin ......................... 455/574 |

(Continued)

FOREIGN PATENT DOCUMENTS

| WO | WO 01/03371 A2 | 1/2001 |
| WO | WO 2006/049724 A1 | 5/2006 |
| WO | WO 2007/024918 A2 | 3/2007 |
| WO | WO 2007/075968 A2 | 7/2007 |

OTHER PUBLICATIONS

Mar. 16, 2010 International Search Report issued in PCT/US2009/050000.

(Continued)

*Primary Examiner* — Alina N. Boutah (57) ABSTRACT

Aspects of the disclosure provide a method for service discovery. The method includes receiving a first service advertisement by a first device. The first service advertisement includes at least a service of a second device. Further, the method include updating a service directory of the first device to include the service of the second device, and transmitting a second service advertisement by the first device. The second service advertisement includes at least the service of the second device, and can be used by a third device to effect use of the service of the second device.

16 Claims, 10 Drawing Sheets

(56) References Cited

U.S. PATENT DOCUMENTS

| | | | |
|---|---|---|---|
| 2003/0228861 A1* | 12/2003 | Leung et al. | 455/412.1 |
| 2004/0081111 A1* | 4/2004 | Bae et al. | 370/316 |
| 2005/0018643 A1* | 1/2005 | Neilson et al. | 370/347 |
| 2005/0138144 A1* | 6/2005 | Sethi | 709/219 |
| 2006/0038887 A1* | 2/2006 | Chen et al. | 348/211.3 |
| 2006/0168388 A1* | 7/2006 | von Tetzchner | 710/305 |
| 2006/0218419 A1* | 9/2006 | Iwamura et al. | 713/300 |
| 2007/0286136 A1* | 12/2007 | Rittle et al. | 370/338 |
| 2007/0293223 A1* | 12/2007 | Kuwana | 455/436 |
| 2008/0123577 A1* | 5/2008 | Jaakkola et al. | 370/311 |
| 2008/0130639 A1* | 6/2008 | Costa-Requena et al. | 370/389 |
| 2009/0222530 A1* | 9/2009 | Buford et al. | 709/217 |
| 2009/0249455 A1* | 10/2009 | Hinsey | 726/5 |
| 2009/0279449 A1* | 11/2009 | Kneckt et al. | 370/253 |
| 2009/0316585 A1* | 12/2009 | Srinivasan et al. | 370/241 |
| 2010/0002610 A1* | 1/2010 | Bowser et al. | 370/311 |
| 2010/0034188 A1* | 2/2010 | Quick et al. | 370/349 |
| 2010/0293264 A1* | 11/2010 | Ramsay | 709/223 |

OTHER PUBLICATIONS

IEEE Standards, IEEE Standard for Information Technology, IEEE Std 802.11b-1999/Cor 1-2001, IEEE Computer Society, The Institute of Electrical and Electronics Engineers, Inc., New York, NY, Nov. 7, 2001, 23 pages.

Draft Supplement to Standard [for] Information Technology, IEEE P802.1Ig/D8.2, Apr. 2003 (Supplement to ANSI/IEEE Std 802.11 1999 (Reaff 2003)), The Institute of Electrical and Electronics Engineers, Inc., New York NY, pp. 1-69.

Part 11: Wireless LAN Medium Access Control (MAC) and Physical Layer (PHY) Specifications, High-speed Physical Layer in the 5 GHz Band, Supplement to IEEE Standard for Information Technology, IEEE Std 802,11a-1999, 91 pages.

IEEE Standard for Local and Metropolitan Area Networks, Part 16: Air Interface for Fixed Broadband Wireless Access Systems, IEEE Computer Society and the IEEE Microwave Theory and Techniques Society, IEEE Std 802.16-2004, New York, NY, Oct. 1, 2004, pp. 1-857.

Combined Office Action and Search Report issued Feb. 7, 2013 in Chinese Application No. 200980126854.1 (With English Translation).

Office Action issued Aug. 6, 2013 in Chinese Patent Application No. 200980126854.1 (English translation only).

* cited by examiner

SERVICE DISCOVERY METHODS

INCORPORATION BY REFERENCE

This application claims the benefit of U.S. Provisional Application No. 61/080,152, "Service Discovery Methods" filed on Jul. 11, 2008, which is incorporated herein by reference in its entirety.

BACKGROUND

A wireless communication network can include various electronic devices. For example, the wireless communication network can include mobile devices, such as mobile phones, personal digital assistants (PDAs), laptops, gaming consoles, and the like. In addition, the wireless communication network may include stationary devices, such as desktops, workstations, printers, scanners, and the like, that can be equipped with a wireless network interface card. These electronic devices can offer a variety of services, such as printing, scanning, downloading files, taking pictures, and the like. A user device may be interested in one or more of such services, but discovering those services can be a tedious task with an increasing number of such services offered by various devices in the network.

SUMMARY

Aspects of the disclosure can provide a method, a wireless device, and a network for service discovery. The service discovery method enables the user to discover services through service advertisements by devices other than the devices that support the services, and thus can reduce a service discovery time and power consumed by devices.

The method for service discovery can include receiving a first service advertisement by a first device. The first service advertisement includes at least a service of a second device. Further, the method can include updating a service directory of the first device to include the service of the second device, and transmitting a second service advertisement by the first device. The second service advertisement includes at least the service of the second device. The second service advertisement can be used by a third device to effect use of the service of the second device.

According to the disclosure, transmitting the second service advertisement by the first device. The second service advertisement includes at least a service of the first device.

According to an aspect of the disclosure, transmitting the second service advertisement by the first device can further include including an information element for the service of the second device in a message, and transmitting the message.

According to an aspect of the disclosure, the method can further include including an information element for at least a service of the first device in a message, and transmitting the message.

In an embodiment, the information element includes at least a Media Access Control (MAC) address of the second device and a service discovery protocol data unit (SPDU) including at least a service attribute of the service of the second device.

According to an aspect of the disclosure, transmitting the second service advertisement by the first device can further include at least one of broadcasting and unicasting the second service advertisement.

According to an aspect of the disclosure, the first service advertisement is not received by the third device.

According to an aspect of the disclosure, transmitting the second service advertisement by the first device can further include transmitting the second service advertisement at least while positions of the first and third devices stay the same as when the first device receives the first service advertisement.

In addition, the method can include transmitting the second service advertisement by the first device at least while the second device is operating in a power savestate or while the second device is not within wireless communication range of the third device.

According to the disclosure, a wireless device can include a transceiver module configured to receive service advertisements from other devices and transmit service advertisements to other devices, a memory module configured to store a service directory, and a processor. The processor is configured to obtain from the transceiver module a first service advertisement. The first service advertisement includes at least a service of a first device. Further, the processor is configured to update the service directory to include the service of the first device, and instruct the transceiver module to transmit a second service advertisement. The second service advertisement includes the service of the first device. The second service advertisement can be used by a second device to effect use of the service of the first device.

According to the disclosure, a network for service discovery can include a first node configured to transmit a first service advertisement. The first service advertisement includes at least a service of the first node. Further, the network includes a second node configured to receive the first service advertisement, update a service directory to include the service of the first node, and transmit a second service advertisement. The second service advertisement includes at least a service of the second node and the service of the first node. The network also includes a third node configured to receive the second service advertisement, and communicate with the first node to use the service of the first node.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
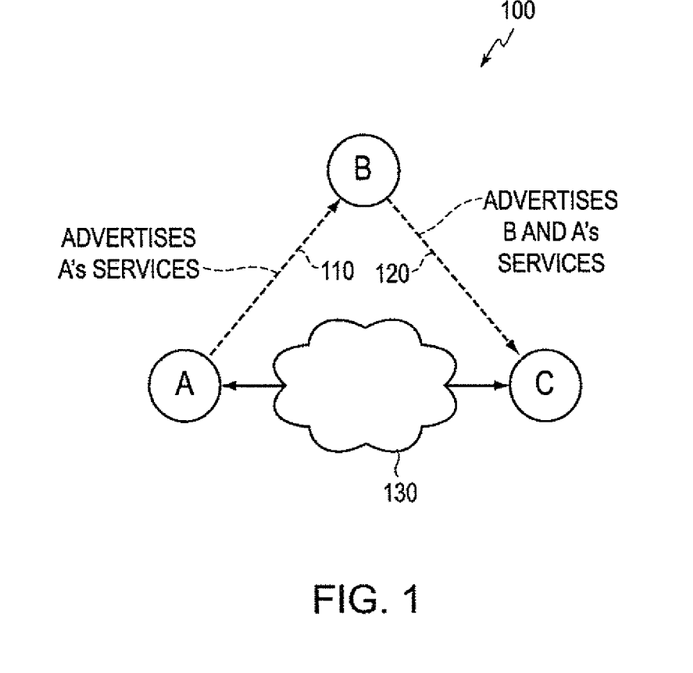
FIG. 1 shows a plot diagram of an exemplary service discovery network.

FIG. 1 shows a plot diagram of an exemplary service discovery network 100. The network 100 can include various electronic devices, such as devices A, B, and C shown in FIG. 1. These devices, for example, may be mobile devices, such as laptops, mobile phones, PDAs, gaming consoles, and the like. In addition, these devices can be stationary devices, such as desk tops, printers, scanners, work stations, and the like, that are equipped with a wireless network interface card that can enable wireless communications. The various electronic devices may communicate via communication channels.

The communication channels can include wireless communication links that can be implemented according to various wireless standards and protocols, such as Wi-Fi (IEEE 802.11a/b/g), WiMax (IEEE 802.16), Bluetooth, GSM, GPRS, UMTS, and the like. The wireless communication links can be implemented with a service discovery protocol, such as the service discovery protocol described in Applicant's co-pending U.S. application Ser. No. 11/923,347, which is incorporated herein by reference in its entirety. Further, the service discovery protocol can be implemented at various communication layers, such as at least in one of the Data-Link, Network Transport, and Application layers.

Additionally, the communication channels can include mechanisms other than the wireless communication links. For example, the communication channel 130 between devices A and C can be mesh based routing, AP bridging, and communication over Internet.

According to the disclosure, a device in the network 100 may advertise services. The services can be provided by the device that advertises the services or by another device. For example, device A can advertise its service(s) in a form of a broadcast or unicast. The service advertisement from device A can be received by device B as shown by element 10 in FIG. 1. The service advertisement 10 can include a Media Access Control (MAC) address of the device offering the service(s), in this example, device A, and at least one or more service attributes of the service(s). Subsequently, device B can update its service directory with the received service advertisement 10. Then, device B can advertise device A's service(s). Device B may also advertise its own service(s).

Device C can receive a service advertisement from device B. Device C may be interested in device A's service(s). Thus, device C may communicate with device A to request device A's service(s).

In an embodiment, device C may be unable to receive the service advertisement from device A, but can receive the service advertisement from device B. For example, device C may be inactive (e.g., in a power save state) or out of communication range with device A. Because device B also advertises device A's service(s), device C can discover device A's service(s) by means other than directly receiving service advertisement from device A.

During operation of the service discovery network 100, device A may advertise its services(s), for example, such as downloading photographs. Device B, actively listening to any service advertisement and also being within a communication range with device A, can receive the service advertisement from device A. Subsequently, device B can update its service directory with the received service advertisement.

Device B then can advertise its own service(s) as well as the service(s) offered by device A. Device C, which could not receive the service advertisement from device A for any reason (e.g., device C was in a power save state or out of range with device A), can now receive the service advertisement from device B. Thus, device C can discover the service(s) offered by device A, and can communicate with device A to request device A's service(s), for example, over Internet. According to an embodiment of the disclosure, a service advertisement can be included in a beacon or response message in the form of an information element (IE).

Figure 2:
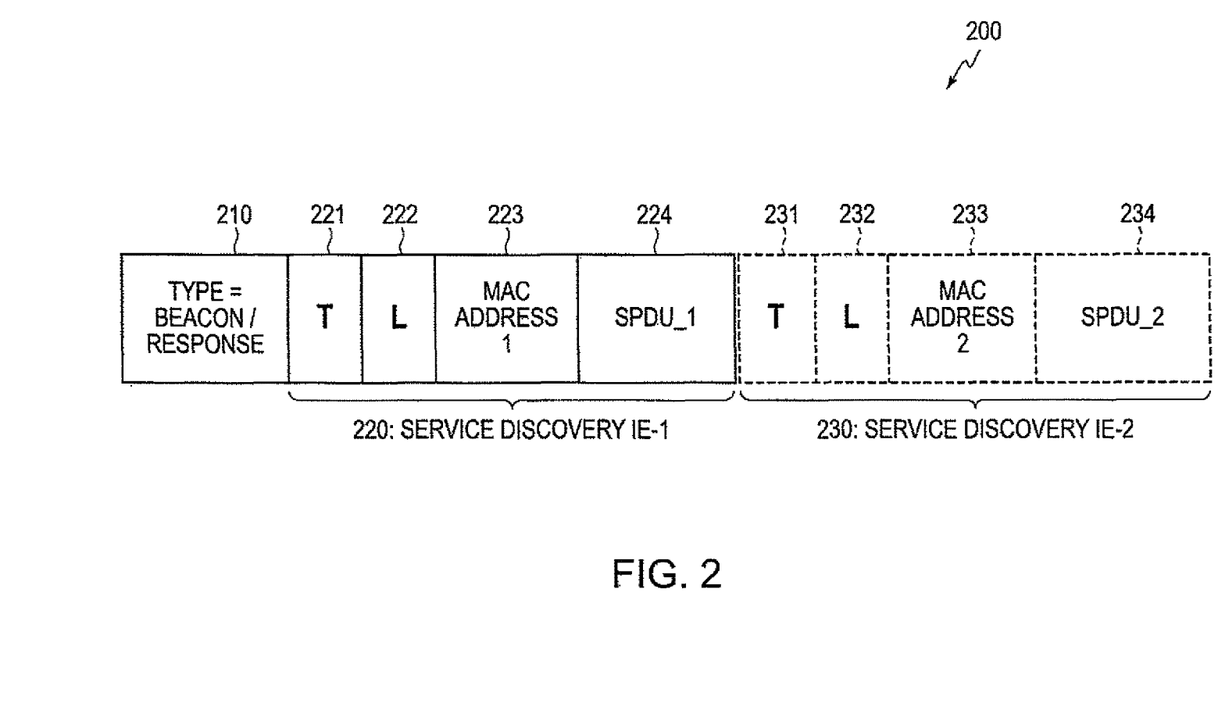
FIG. 2 shows an exemplary format of a message that includes a service discovery information element (IE) according to an embodiment of the disclosure.

FIG. 2 shows an exemplary format of a message 200 that includes service discovery information elements (IEs) 220 and 230. Devices A, B, and C can use the service discovery IEs in their messages to convey their service advertisements. The message 200 can include a first service discovery IE 220, and a second service discovery IE 230 for service discovery. In addition, the message 200 may include other information, such as beacon or response content 210.

The service discovery IE-1 220 can further include the following sub fields: a sub-field T 221 indicating a service type of the service discovery IE-1 220, a sub-field L 222 indicating the length of the service discovery IE-1 220, MAC address field-1 223, and a first service discovery protocol data unit (SPDU) SPDU_1 224 conveying at least a first service attribute.

The service discovery IE-1 230 can also include the following sub fields: sub-field T 231 indicating a service type of the service discovery IE-2 230, a sub-field L 232 indicating the length of the service discovery IE-2 230, MAC address field-2 233, and a second service discovery protocol data unit SPDU_2 234 conveying at least a second service attribute.

During operation of the network 100, device A may advertise its service(s), for example, by broadcasting a service advertisement in a beacon. The beacon can include the service advertisement in a service discovery IE. The MAC address field-1 223 can include the MAC address of device A, and the SPDU_1 224 can convey at least a service attribute of device A's service(s). Device B may include a service directory to record its own services and services of other devices. Device B can receive the beacon from device A. Device B can update its service directory with the service advertisement conveyed in the beacon.

Consequently, device B can advertise device A's service(s) as well as its own by broadcasting or unicasting its service advertisement, for example, by transmitting a beacon. The beacon can include the service advertisements of devices B and A in the form of service discovery IEs. For example, a first service discovery IE-1 220 includes service advertisement of device B, and a second service discovery IE-2 230 includes service advertisement of device A. Furthermore, the MAC address field-1 223 can include the MAC address of device B, the SPDU_1 224 can convey at least a service attribute of device B's service(s), the MAC address field-2 233 can include the MAC address of device A, and the SPDU_2 234 can convey at least a service attribute of device A's service(s).

In some situations, device C cannot receive the beacon from device A but device C can receive the beacon from device B. Since the beacon from device B includes service advertisement information from device A, device C then can discover device A's service(s) as well as device B's service(s) conveyed in the beacon. Device C may be interested in device A's service(s), and thus communicate with device A, for example, over Internet to request device A's service(s).

Figure 3:
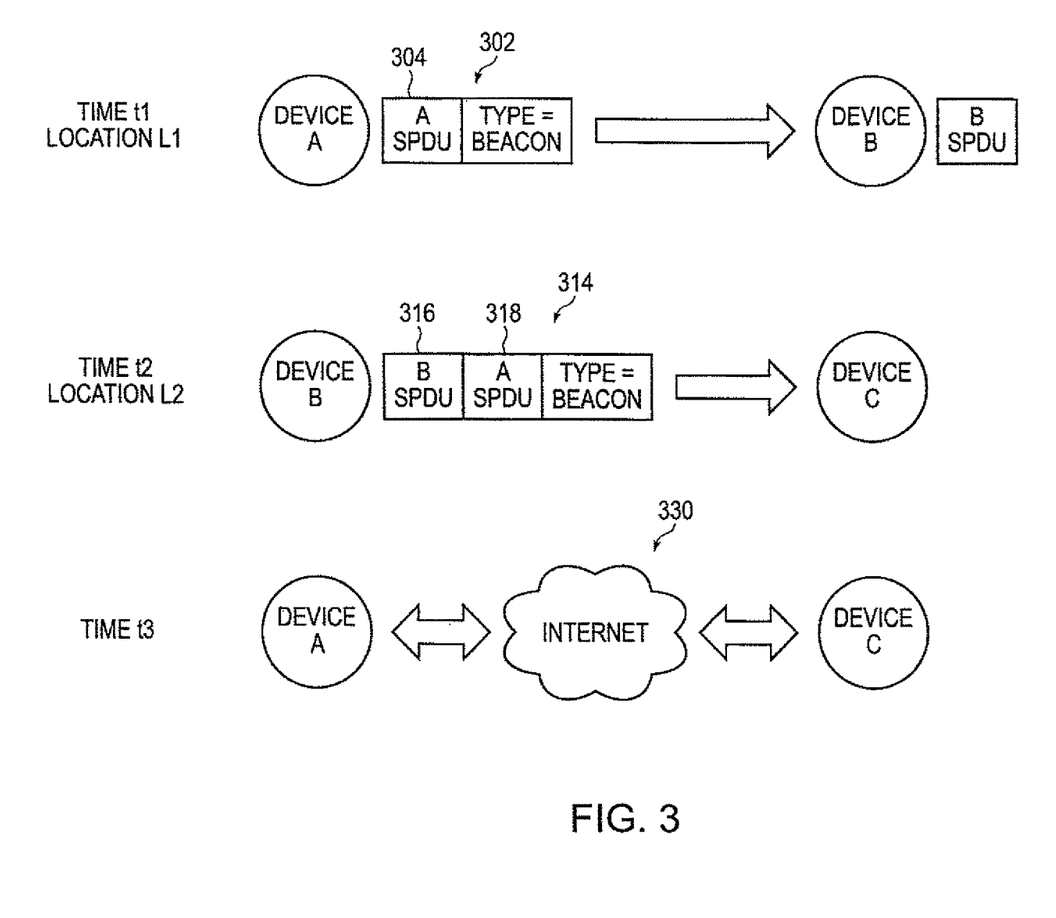
FIG. 3 illustrates an exemplary service discovery scenario.

FIG. 3 illustrates an exemplary service discovery scenario. In this scenario, a device, for example, device B as shown in FIG. 3, may move from a first location (L1) to a second location (L2). At the first location, device B can receive a service advertisement of device A. At the second location, device B can relay the service advertisement of device A to device C. Thus, device C can discover device A's service(s) through device B's service advertisement, as described below in more details.

At time t1, devices A and B are able to communicate with each other because, for example, they are located within their wireless communication range at location L1 and both of the devices are active. Thus, device B can receive a broadcast, such as a beacon 302, from device A. However, device C cannot receive the beacon 302 at time t1 because, for example, device C is out of the wireless communication range with device A.

The beacon 302 may include the service advertisement of device A, for example, in the form of the message 200 in FIG. 2. The beacon 302 can include a service discovery IE 304, which can include a MAC address of device A, and a SPDU including at least a service attribute of device A's service(s). Device B can update its service directory with device A's service information in the beacon 302.

At time t2, device B may move to location L2. Further, device B can send messages, such as a beacon 314. The beacon 314 can include the service advertisement of device A as well as the service advertisement of device B. The beacon 314 can convey the service advertisements of devices A and B in service discovery IEs. For example, the beacon 314 includes a first service discovery IE 316 and a second service discovery IE 318. The first service discovery IE 316 can include a MAC address of device B and a SPDU including at least a service attribute of device B's service(s). The second service discovery IE 318 can include the MAC address of device A and a SPDU including at least a service attribute of device A's service(s).

At this time t2, devices B and C are able to communicate with each other because, for example, device B is located at L2 that is within the wireless communication range of device C, and both of the devices are active. Thus, device C can receive the beacon 314 from device B. Device C can discover the service(s) offered by device A as well as device B. Device C may be interested in device A's service(s), and decide to communicate with device A.

At time t3, device C may initiate a communication process with device A to use the service(s) of device A. In an example, device C may request device A's service(s) via Internet 330 even though devices A and C are not within wireless communication range of each other.

Figure 4:
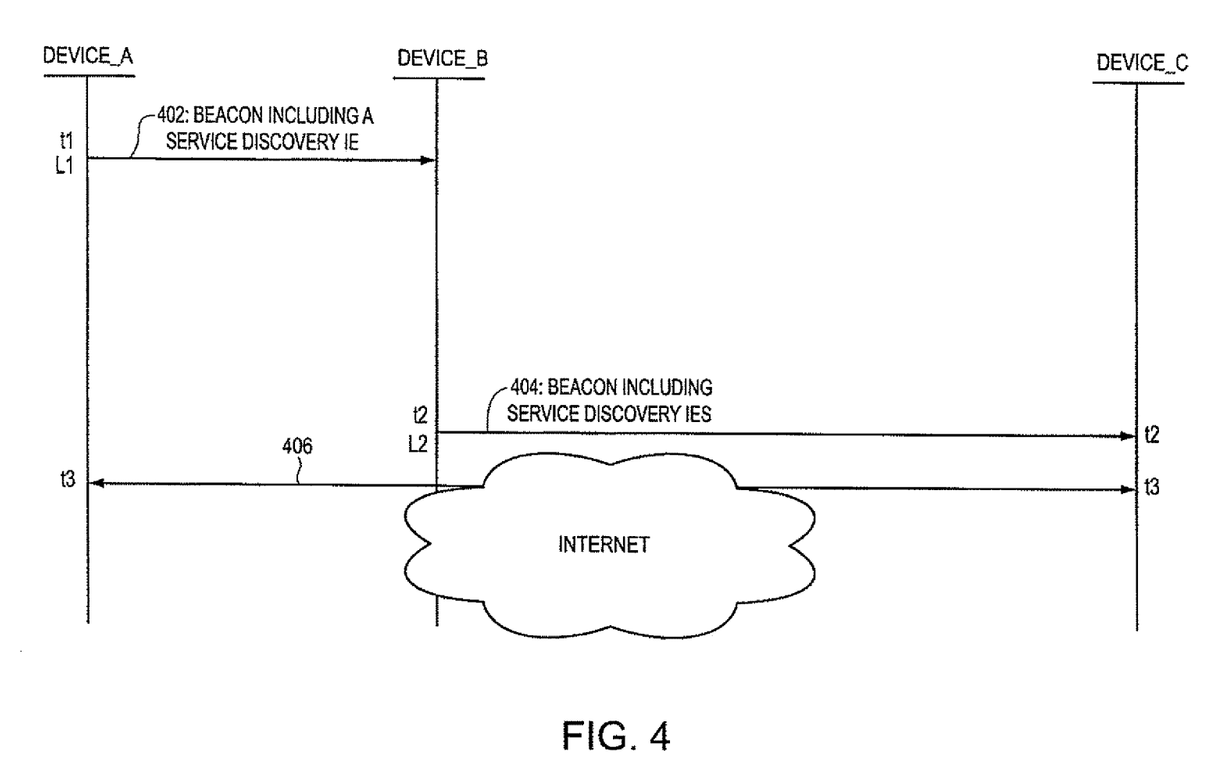
FIG. 4 is a message sequence chart illustrating an exemplary sequence of messages being exchanged between network devices corresponding to the scenario in FIG. 3.

FIG. 4 is a message sequence chart illustrating an exemplary sequence of messages being exchanged between network devices corresponding to the scenario in FIG. 3. At time t1, devices A and B are able to communicate with each other at location L1. Device A advertises its service(s) by sending a beacon 402, which may include a service discovery IE. The service discovery IE, such as the IE-1 220 as shown in FIG. 2, can include device A's service advertisement. The service discovery IE can include a MAC address of device A and a SPDU including at least a service attribute of device A's service(s). Device B can receive the beacon 402. Device B can update its service directory with device A's service information received through the beacon 402.

At time t2, device C is able to communicate with device B at location L2. Device B can advertise device A's service(s) as well as its service(s) by sending a beacon 404. The beacon 404 can include a first and second service discovery IEs. The first and second service discovery IEs can include device B and A's service advertisements, for example, in the form of the IE-1 220 and IE-2 230 as shown in FIG. 2. The first service discovery IE can include a MAC address of device B and a SPDU including at least a service attribute of device B's service(s). The second service discovery IE can include a MAC address of device A and a SPDU including at least a service attribute of device A's service(s). Thus, device C can discover device A's service(s) as well as device B's. Device C may be interested in device A's service(s).

At time t3, device C may initiate communication with device A, for example, over Internet, to request device A's service(s) even though devices A and C are not within wireless communication range of each other.

Figure 5:
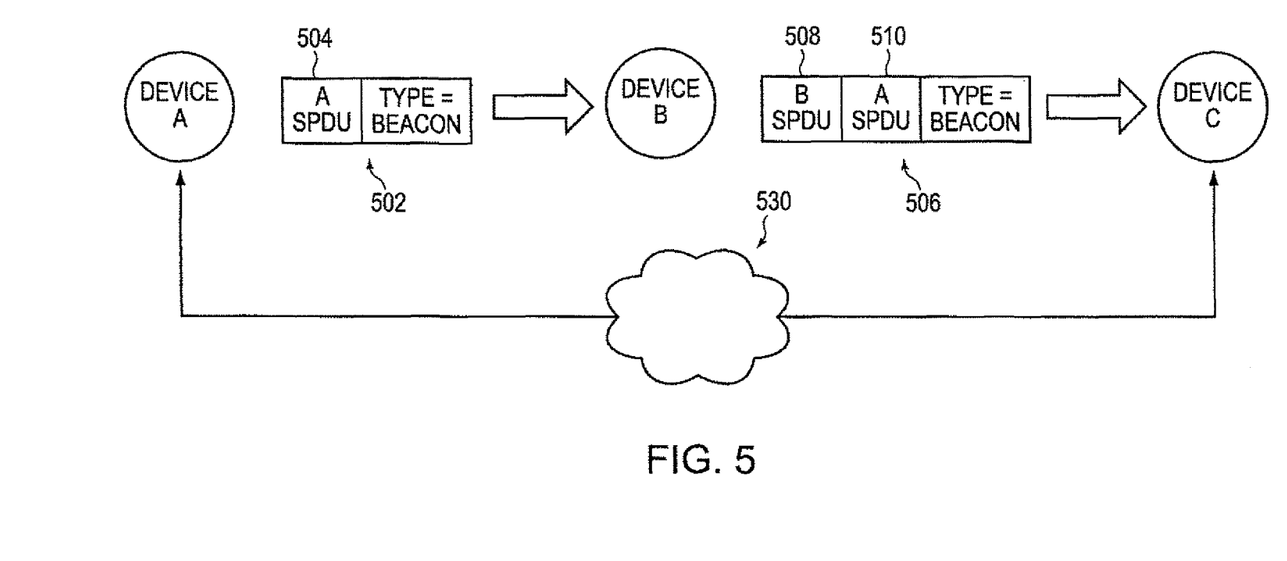
FIG. 5 illustrates another exemplary service discovery scenario.

FIG. 5 illustrates another exemplary service discovery scenario. In this scenario, a device, such as device B, may be positioned at a location where device B can directly communicate with devices A and C, while devices A and C cannot directly communicate with each other. Device C can receive a service advertisement from device B, which can include a service advertisement of device A's service(s). Thus, device C can discover device A's service(s) through device B's service advertisement, as described below in further details.

Device A can advertise its service(s) by sending a beacon 502. The beacon 502 can include a service advertisement of device A, for example, in a form of a service discovery IE 504 to convey a MAC address of device A and a SPDU including at least a service attribute of device A's service(s). Device B, actively listening, may be within a wireless communication range with device A. Thus, device B can receive the beacon 502. Device B can update its service directory with the first service advertisement conveyed in the beacon 502.

Subsequently, device B can send a beacon 506. The beacon 506 can include a service advertisement for device B and the service advertisement for device A. Both of the service advertisements can be in a form of a service discovery IE. For example, a first service discovery IE 508 can include a MAC address of device B and a SPDU including at least a service attribute of device B's service(s); and a second service discovery IE 510 can include a MAC address of device A and a SPDU including at least a service attribute of device A's service(s).

Device C, actively listening, can be within a wireless communication range of device B. Thus, device C can receive the beacon 504 from device B. Device C can discover device A's service(s) as well as device B's. Device C may communicate with device A to request device A's service(s), for example, over Internet.

Figure 6:
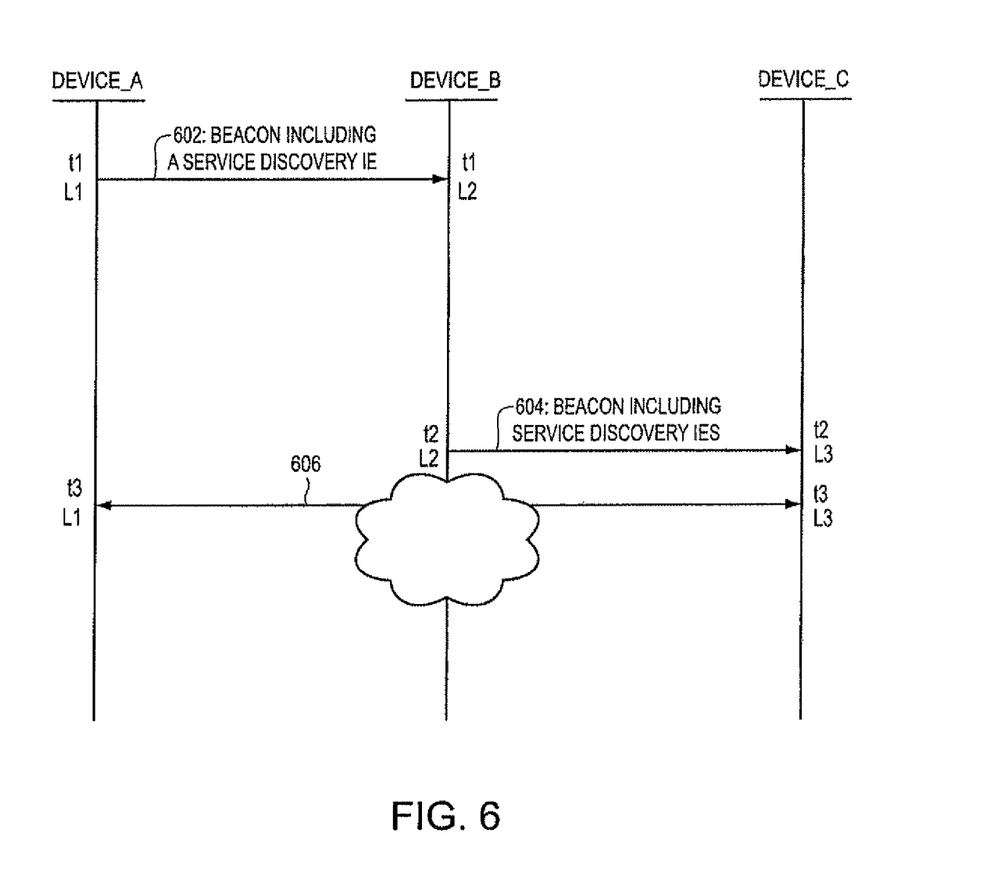
FIG. 6 is a message sequence chart illustrating an exemplary sequence of messages being exchanged between network devices corresponding to the scenario in FIG. 5.

FIG. 6 is a message sequence chart illustrating an exemplary sequence of messages being exchanged between network devices corresponding to the scenario in FIG. 5. Devices A, B, and C are located at L1, L2, and L3 respectively. From their respective locations, device B is able to directly communicate with devices A and C. However, devices A and C cannot directly communicate with each other.

At time t1, device A advertises its service(s) by sending a beacon 602, which may include a service discovery IE. The service discovery IE can include device A's service advertisement, for example, in the form of the service discovery IE-1 220 as shown in FIG. 2. The service discovery IE can include a MAC address of device A and a SPDU including at least a service attribute of device A's service(s). Device B can receive the beacon 602. Device B can update its service directory with the information in the beacon 602.

At time t2, device B can advertise device A's service(s) as well as its service by sending a beacon 604. The beacon 604 can include a first and second service discovery IEs. The first and second service discovery IEs can include device B's and A's service advertisements in the form of the IE-1 220 and the IE-2 230 as shown in FIG. 2. The first service discovery IE-1 220 can include a MAC address of device B and a SPDU including at least a service attribute of device B's service(s). The second service discovery IE-2 230 can include a MAC address of device A and a SPDU including at least a service attribute of device A's service(s). Thus, device C can discover device A's service(s) as well as device B's. Device C may be interested in device A's service(s).

At time t3, device C may initiate a communication with device A, for example, over Internet to request device A's services(s).

Figure 7:
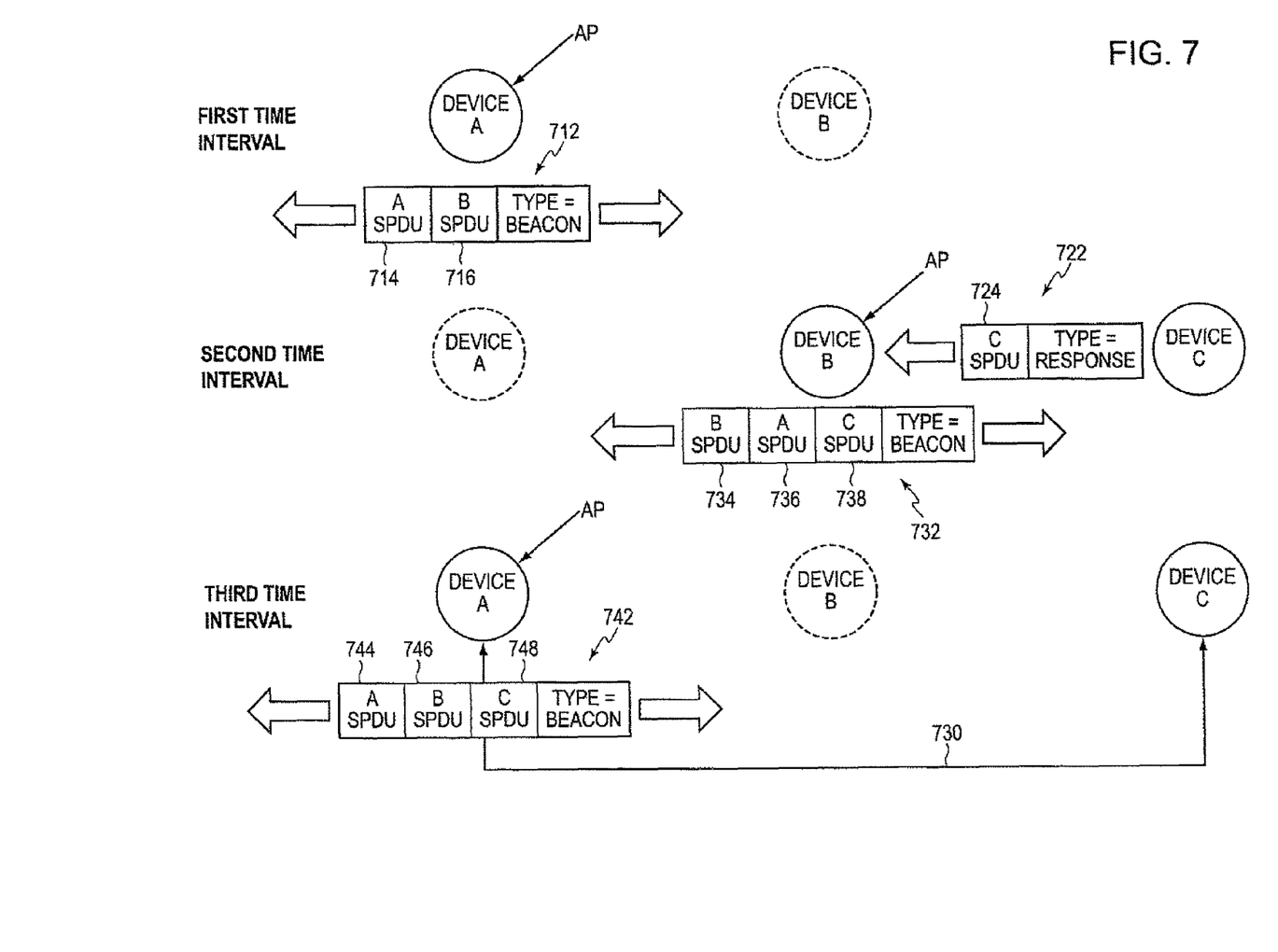
FIG. 7 illustrates another exemplary service discovery scenario.

FIG. 7 illustrates another exemplary service discovery scenario. In this scenario, for a time period, a first device of a network may be configured to operate in a power save state in which the first device may not be able advertise its service(s). However, a second device, serving as an access point (AP) of the network for the time period, may advertise service(s) of the first device so that a third device can discover the first device's service(s) even while the first device is operating in the power save state. The third device may be interested in the first device's service(s), and initiate communication with the first device when the first device becomes active, as explained below in further details.

During a first time interval, device A may be serving as an AP of a network. Device A may receive service advertisements from various devices in the network, and update its service directory. For example, device A may receive a message from another device, such as device B, while previously serving as the AP, and update device A's service directory to include device B's service(s). While serving as the AP of the network, device A may send a beacon 712 to advertise services provided by devices in the network, for example, device B's service(s) as well as device A's service(s).

The beacon 712 may include one or more service discovery IEs, for example, a first service discovery IE 714 for device A's service(s) and a second service discovery IE 716 for device B's service(s). In an example, the first service discovery IE 714 includes a MAC address of device A and a SPDU including at least a service attribute of device A's service(s); and the second service discovery IE 716 includes a MAC address of device B and a SPDU including at least a service attribute of device B's service(s).

Device B may be configured to operate in a power save state, as in this example. In such state, device B may not be able to receive the beacon 712. However, device A may update device B in the beginning of a second time interval as device B becomes active to serve as the AP of the network, as disclosed by the U.S. Provisional Application No. 61/080, 143, "AP Rotation and Pseudo-APs", and the co-pending U.S. patent application Ser. No. 12/499,937 "Access Point Rotation for Sharing Power Load" filed on Jul. 9, 2009, which are incorporated herein by reference in its entirety. Device B then can update its service directory with the service advertisement of device A.

During the second time interval, device A can be configured to operate in a power save state while device B is serving as the AP of the network. Device C may want to join the network. Device B may send a probe request inquiring about a service offered by device C, and in return, receive a probe response (not shown) 722 from device C. The probe response 722 can include a service discovery IE 724. For example, the service directory IE 724 may include a MAC address of device C and a SDPU including at least a service attribute of device C's service(s). Device B can update its service directory with device C's service information in the probe response 722.

Device B, serving as the AP of the network, can send a beacon 732. The beacon 732 may include a first 734, second 736, and third 738 service discovery IEs. The three service discovery IEs can convey services advertisements of devices B, A, and C. In an example, the first service discovery IE 734 includes a MAC address of device B and a SPDU including at least a service attribute of device B's service(s); the second service discovery IE 736 includes a MAC address of device A and a SPDU including at least a service attribute of device A's service(s); and the third service discovery IE 738 includes a MAC address of device C and a SPDU including at least a service attribute of device C's service(s).

Device C can receive the beacon 732, and discover device A's service(s) as well as device B's. For example, device C may be interested in device A's service(s), and initiate a communication when device A becomes active. When device A becomes active, for example, at the beginning of the third time interval, device B can update device A with the service advertisement of device C.

During the third time interval, device A may switch its mode of operation from a power save state to an active state to serve as the AP of the network. Device B can be configured to go into a power save state. Device A can send a beacon 742. The beacon 742 can include one or more service discovery IEs to convey services advertisements of device A, B, C's service(s), as explained before. Device C can receive the beacon 742, and discover that device A is active. Subsequently, device C can initiate communication with device A to request device A's service(s).

Figure 8:
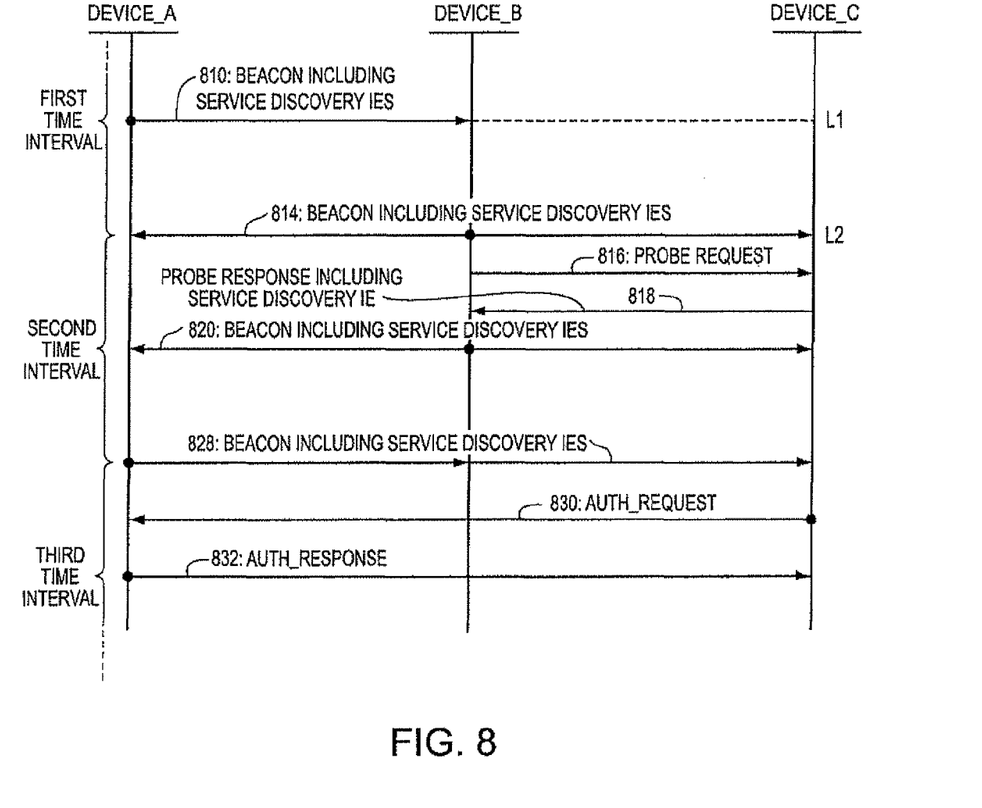
FIG. 8 is a message sequence chart illustrating an exemplary sequence of messages being exchanged between network devices corresponding to the scenario in FIG. 7.

FIG. 8 is a message sequence chart illustrating an exemplary sequence of messages being exchanged between network devices, such as A, B, and C corresponding to the scenario in FIG. 7. During the first time interval, device A may be serving as the AP of the network. Device A can advertise device B's service(s) as well as its service(s) by broadcasting a service advertisement via, for example, a beacon 810. The beacon 810 can include a first and second service discovery IEs. In an example, the first service discovery IE includes a MAC address of device A and a SPDU including at least a service attribute of device A's service(s); and the second service discovery IE includes a MAC address of device B and a SPDU including at least a service attribute of device B's service(s).

Device B can receive the beacon 810 if device B is active. If device B is not active, for example, in a power save state, then device A may update device B in the beginning of the second time interval as device B becomes active to serve as the AP of the network. Device C may not receive the beacon 810 during the first time interval. In an example, device C at location L1 is outside of a wireless communication range with device A.

During the second time interval, device B, serving as the AP of the network, can advertise device A's service(s) as well as its own service(s) while device A is in a power save state. Device B can advertise by sending a beacon 814. The beacon 814 can include service discovery IEs conveying devices B and A's service(s). For example, a first service discovery IE includes a MAC address of device B and a SPDU including at least a service attribute of device B; and a second service discovery IE includes a MAC address of device A and a SPDU including at least a service attribute of device A.

Device C can receive the beacon 814 at this time. In an example, device C is within a wireless communication range with device B. Subsequently, device C can discover device A's service(s) as well as device B's from the beacon 814. In this way, device C can discover device A's service(s) even while device A, being in a power save state, cannot send its service advertisement. Device C may be interested in device A's service(s), and may initiate a communication with device A when device A becomes active.

In an example, device C may decide to join the network and send a registration request to the AP of the network, served by device B in the second time interval, and receive a registration response from the AP. Device B, serving as the AP of the network, may send a probe request 816 to device C. Device C may return a probe response 818 to the AP served by device B.

The probe response 818 may include a service discovery IE conveying a MAC address of device C and a SPDU including at least a service attribute of device C. Device B can update its service directory with device C's service information in the probe response 818.

Device B, serving as the AP of the network, can advertise device C's service(s) as well as its own and device A's service(s) by sending a beacon 820. The beacon 820 can include one or more service discovery IEs conveying devices B, A, and C's service advertisements. In an example, a first service discovery IE includes a MAC address of device B and a SPDU including at least a service attribute of device B's service(s); a second service discovery IE includes a MAC address of device A and a SPDU including at least a service attribute of device A's service(s); and a third service discovery IE includes a MAC address of device C and a SPDU including at least a service attribute of device C's service(s). At the beginning of the third time interval, device B may update device A for device A to serve as the AP of the network again. In an example, device B updates device A with the service advertisement of device C.

During the third time interval, device A may advertise the service(s) offered by devices A, B, and C by sending a beacon 828. The beacon 828 can include one or more service discovery IEs, as explained before. Device C can receive the beacon 828, and discover that device A is active. Then, device C may send an authorization request 830 to request the service(s) offered by device A. Device A may send an authorization response 832 back to device C.

As illustrated, even while device A is inactive, for example, in a power save state, device A's service(s) could still be advertised by another device, such as device B. Consequently, device C, which may be interested in device A's service(s), can discover device A's service(s) through device B's service advertisement. This service discovery scheme can reduce service discovery time as well as power consumed by devices, as the services offered by the devices could be still advertised while those devices operate in a power save state.

Figure 9:
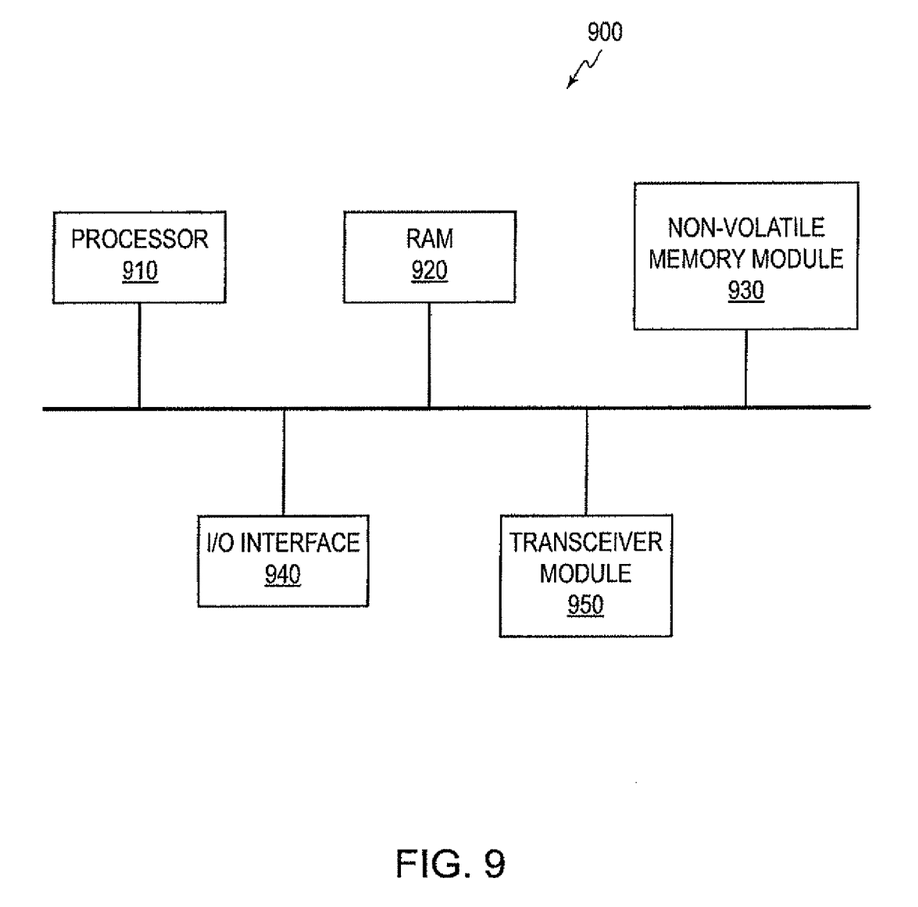
FIG. 9 shows a block diagram of an exemplary controller in a wireless device.

FIG. 9 shows a block diagram of an exemplary controller 900 in a wireless device, which can support a service discovery protocol. The controller 900 of the wireless device may include a processor unit 910, such as a general processor, a random access memory (RAM) unit 920, a non-volatile memory module 930, an I/O interface unit 940, and a transceiver module 950. These elements can be coupled together as shown in FIG. 9.

The processor unit 910 can execute system and application programs. The non-volatile memory module 930 can be used to store system and application programs, such as firmware. The system and application programs may include an algorithm that may implement a service discovery protocol.

The RAM unit 920 is readable and writable. Generally, the RAM unit 920 can have a fast access speed. It is preferred that data and codes of software programs are stored in the RAM unit 920 during operation, such that the processor unit 910 can access the RAM unit 920 for the codes and data instead of the non-volatile memory module 930.

The I/O interface unit 940 is capable of taking input from the user and providing output to the user. For example, the I/O interface unit 940 can include a key pad, a screen display, a touch screen, and the like. The user can input by pressing, for example, keys on the key pad or the touch screen, and monitor the status of the controller 900 displayed on the screen display, such as a list of discovered services available in a network, power level, signal strength, operation mode (e.g., AP or non-AP mode) and the like.

The transceiver module 950 can be configured according to various standards and protocols. In an embodiment, the transceiver module 950 may support various wireless standards and protocols, such as Wi-Fi (IEEE 802.11 ablg), WiMax (IEEE 802.16), Bluetooth, GSM, GPRS, UMTS, and the like. The transceiver module 950 may further support a service discovery protocol that can be implemented at least in one of the Data-Link, Network/Transport, and Application layers of the supported wireless standards and protocols.

During operation, the transceiver module 950 may receive a signal (e.g., beacon or response) conveying a service advertisement from another wireless device. The signal can be digitally sampled and transmitted to the processor unit 910. The digital samples of the signal can be stored in the RAM unit 920 and processed by the processor unit 910. The processor unit 910 may execute software programs, such as an algorithm implementing at least a wireless standard.

In an example, the wireless standard is implemented with a number of layers in accordance with the Open Systems Interconnection (OSI) Seven Layer Model: the Application, Presentation, Session, Transport, Network, Data-Link, and Physical layers, which may be stored in the non-volatile memory module 930. Furthermore, the algorithm may implement a service discovery protocol, for example, at least in one of the Data-Link, Transport, Network, and Application layers. The processor unit 910 may execute the algorithm to analyze the service advertisement according to the service discovery protocol. Then, the processor unit 910 may identify a new service offered by the other device.

More specifically, the processor unit 910 may execute the algorithm to decode the digital samples of the signal stored in the RAM unit 920. The decoding of the digital samples may extract a service discovery IE received from the transceiver module 950. In an example, subsequent decoding of the service discovery IE extracts a MAC address of the other wireless device and a SPDU including at least a service attribute of the other wireless device's service(s). The processor unit 910 may also update a service directory stored in the RAM unit 920 with the information decoded from the service advertisement. The updated service directory may list newly discovered service(s) offered by the other wireless device.

In an embodiment, the processor unit 910 may retrieve the updated service directory stored in the RAM unit 920 to compose a message, such as a beacon or probe response. The processor unit 910 may instruct the transceiver module 950 to transmit the message to advertise the service(s) offered by the other wireless device. The message may also include service(s) offered by the wireless device. The message may include one or more service discovery IEs, as shown in FIG. 2. In an example, one service discovery IE includes a MAC address of the wireless device and a SPDU including at least a service attribute of the wireless device's service(s); and another service discovery IE includes a MAC address of the other wireless device and a SPDU including at least a service attribute of the other wireless device's service(s).

Figure 10:
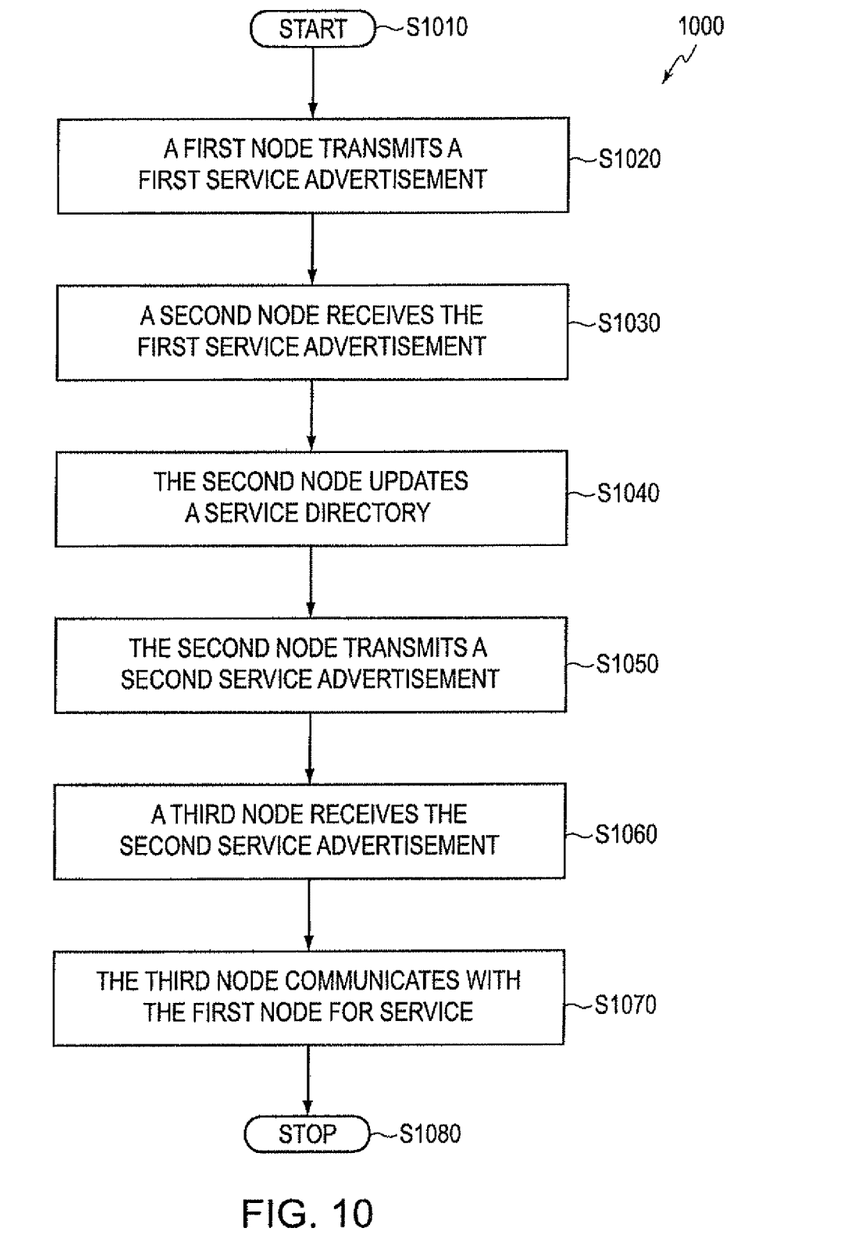
FIG. 10 shows a flow chart outlining an exemplary service discovery process.

FIG. 10 shows a flow chart outlining an exemplary service discovery process 1000 for a network node in a network that supports a service discovery protocol. The process starts at step S1010, and proceeds to step S1020.

In step S1020, a first node in a network can transmit a first service advertisement that includes at least a service of the first node (e.g., downloading/uploading files, printing photos, scanning and the like). Then, the process proceeds to step S1030.

In step S1030, a second node can receive the first service advertisement from the first node. Then, the process proceeds to step S1040.

In step S1040, the second node can update its service directory to include the service(s) offered by the first node. Then, the process proceeds to step S1050.

In step S1050, the second node can instruct its transceiver module to transmit a second service advertisement that includes the service(s) of the first node. The second service advertisement can also include service(s) of the second node. Then, the process proceeds to step S1060.

In step S1060, a third node may receive the second service advertisement, and discover at least the service(s) offered by the first node. Then, the process proceeds to step S1070.

In step S1070, the third node can communicate with the first node to request the service(s) offered by the first node. Then, the process proceeds to step S1080, and terminates.

It is noted that the process 1000 may be repetitively executed by nodes in the network.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for service discovery, comprising:
   receiving a first service advertisement by a first device, the first service advertisement including at least a service of a second device;
   updating a service directory of the first device to include the service of the second device;
   broadcasting a beacon including an information element, the information element including at least a Media Access Control (MAC) address of the second device and a service discovery protocol data unit (SPDU) including at least a service attribute of the service of the second device, for a second service advertisement by the first device, the second service advertisement including at least the service of the second device, wherein the second service advertisement is used by a third device to effect use of the service of the second and
   identifying physical location of the second device from common attributes of a root service class, the at least the service attribute of the service of the second device being defined as an attribute of a sub-class of the root service class.

2. The method of claim 1, wherein the second service advertisement includes at least a service of the first device.

3. The method of claim 1 wherein the first service advertisement is not received by the third device.

4. The method of claim 1, wherein broadcasting for the second service advertisement by the first device, further comprises:
   transmitting the second service advertisement at least while positions of the first and third devices stay the same as when the first device receives the first service advertisement.

5. The method of claim 1, further comprising:
   including another information element for at least a service of the first device in a message; and
   transmitting the message.

6. The method of claim 1, further comprising:
   transmitting the second service advertisement by the first device at least while the second device is operating in a power save state or while the second device is not within wireless communication range of the third device.

7. A wireless device, comprising:
   a transceiver module configured to receive service advertisements from other devices and transmit service advertisements to other devices;
   a memory module configured to store a service directory; and
   a processor configured to obtain from the transceiver module a first service advertisement that includes at least a service of a first device, update the service directory to include the service of the first device, and instruct the transceiver module to broadcast a beacon including an information element, the information element including at least a Media Access Control (MAC) address of a second device and a service discovery protocol data unit (SPDU) including at least a service attribute of a service of the second device, for a second service advertisement that includes the service of the first device, wherein the second service advertisement is used by a second device to effect use of the service of the first device, a physical location of the second device is identified from common attributes of a root service class, the at least the service attribute of the service of the second device being defined as an attribute of a sub-class of the root service class.

8. The wireless device of claim 7, wherein the second service advertisement further includes at least a service of the wireless device.

9. The wireless device of claim 7, wherein the processor is further configured to include another information element for at least the service of the first device in a message and the transceiver module is further configured to transmit the message.

10. The wireless device of claim 9, wherein the other information element includes at least a Media Access Control (MAC) address of the first device and a service discovery protocol data unit (SPDU) including at least a service attribute of the service of the first device.

11. The wireless device of claim 7, wherein the first service advertisement is not received by the second device.

12. The wireless device of claim 7, wherein the processor is further configured to instruct the transceiver module to transmit the second service advertisement at least while the first device is configured to operate in a power save state or while the first device is not within wireless communication range of the second device.

13. A network for service discovery, comprising:
   a first device configured to transmit a first service advertisement that includes at least a service of the first device;
   a second device configured to receive the first service advertisement, update a service directory to include the service of the first device, and broadcast a beacon including an information element, the information element including at least a Media Access Control (MAC) address of the second device and a service discovery protocol data unit (SPDU) including at least a service attribute of a service of the second device, for a second service advertisement that includes at least the service of the second device and the service of the first device, wherein a physical location of the second device is identified from common attributes of a root service class, the at least the service attribute of the service of the second device being defined as an attribute of a sub-class of the root service class; and
   a third device configured to receive the second service advertisement, and communicate with the first device to use the service of the first device.

14. The network of claim 13, wherein the second device is further configured to include another information element for the service of the first device in a message, and transmit the message.

15. The network of claim 13, wherein the first service advertisement is not received by the third device.

16. The network of claim 13, wherein the second device is further configured to transmit the second service advertisement at least while the first device is configured to be in a power save state or while the first device is not within wireless communication range of the third device.

* * * * *